United States Patent
Al-Motawwah

(10) Patent No.: US 10,280,970 B2
(45) Date of Patent: May 7, 2019

(54) PISTON AND CONNECTING ROD ASSEMBLY

(71) Applicant: Abdulkarim A. A. M. A. Al-Motawwah, Safat (KW)

(72) Inventor: Abdulkarim A. A. M. A. Al-Motawwah, Safat (KW)

( * ) Notice: Subject to any disclaimer, the term of this patent is extended or adjusted under 35 U.S.C. 154(b) by 0 days.

(21) Appl. No.: 16/046,929

(22) Filed: Jul. 26, 2018

(65) Prior Publication Data

US 2019/0093701 A1    Mar. 28, 2019

Related U.S. Application Data

(60) Provisional application No. 62/563,003, filed on Sep. 25, 2017.

(51) Int. Cl.
| | |
|---|---|
| *F16J 1/00* | (2006.01) |
| *F16C 7/02* | (2006.01) |
| *F16J 1/16* | (2006.01) |
| *F02F 3/00* | (2006.01) |

(52) U.S. Cl.
CPC ............ *F16C 7/023* (2013.01); *F02F 3/0023* (2013.01); *F16J 1/005* (2013.01); *F16J 1/16* (2013.01)

(58) Field of Classification Search
CPC ...................................................... F16J 1/005
See application file for complete search history.

(56) References Cited

U.S. PATENT DOCUMENTS

| | | | |
|---|---|---|---|
| 76,448 A | 4/1868 | Hinds et al. | |
| 272,662 A | 2/1883 | Davis | |
| 1,394,898 A | 10/1921 | Harriman | |
| 1,559,595 A * | 11/1925 | West | F02F 1/002 |
| | | | 123/78 B |
| 1,900,991 A | 3/1933 | Matheson | |
| 2,785,935 A | 3/1957 | Lippincott | |
| 2,889,182 A | 6/1959 | Marshall | |

FOREIGN PATENT DOCUMENTS

FR    2581721 A1    11/1986

* cited by examiner

*Primary Examiner* — F Daniel Lopez
(74) *Attorney, Agent, or Firm* — Richard C. Litman

(57) ABSTRACT

The piston and connecting rod assembly includes a connecting rod having opposed upper and lower ends, the upper end being pivotally secured to the piston by a conventional piston pin. The lower end of the connecting rod has a passage formed therein for receiving a conventional crankpin. However, an additional sleeve is provided for the piston. The sleeve has at least one sidewall, a closed upper end and an open lower end. The sleeve is releasably secured to the piston by any suitable type of releasable attachment or engagement. An upper surface of the closed upper end of the sleeve may have a plurality of apertures or recesses formed therein, allowing a tool with corresponding pins to engage the sleeve for removal thereof from the piston.

11 Claims, 6 Drawing Sheets

PISTON AND CONNECTING ROD ASSEMBLY

CROSS-REFERENCE TO RELATED APPLICATION

This application claims the benefit of U.S. Provisional Patent Application Ser. No. 62/563,003, filed on Sep. 25, 2017.

BACKGROUND

1. Field

The disclosure of the present patent application relates to internal combustion engines, and particularly to a piston and connecting rod assembly allowing for removal or replacement of the piston without disassembly of the internal combustion engine's cylinder head and associated components.

2. Description of the Related Art

FIG. 2 illustrates a conventional piston and connecting rod assembly 100, such as that typically found in a conventional four-stroke internal combustion engine. As is conventionally known, the piston 112 reciprocates vertically within combustion chamber CC, which is defined within the cylinder head CH beneath the spark plug SP. The upper end 116 of the connecting rod 114 is pivotally secured to the piston 112 by a piston pin 120. The lower end 118 of the connecting rod 114 is pivotally secured (by crank pin 122) to the crankshaft CS, defined within crankcase C. If one wishes to repair or replace the piston 112, various engine components must first be removed, such as spark plug SP, as well as associated hoses, engine mounts, engine pulleys and the like, before the cylinder head CH is fully disassembled. It would obviously be desirable to be able to replace the existing piston and connecting rod assembly 100 with a piston and connecting rod assembly capable of working identically in a conventional engine, but which may be replaced or repaired in a much easier fashion. Thus, a piston and connecting rod assembly solving the aforementioned problems is desired.

SUMMARY

The piston and connecting rod assembly is similar to a conventional piston and connecting rod assembly, including a piston and a connecting rod, where the connecting rod has opposed upper and lower ends. The upper end is pivotally secured to the piston by a conventional piston pin. The lower end of the connecting rod has a passage formed therethrough for receiving a conventional crankpin. However, an additional sleeve is provided for the piston. The sleeve has at least one sidewall, a closed upper end and an open lower end. For an exemplary conventional cylindrical piston, the at least one sidewall is cylindrical. The sleeve is dimensioned and configured to removably and releasably receive and cover the piston. The sleeve is releasably secured to the piston by any suitable type of releasable attachment or engagement. For example, an outer surface of the piston may be threaded and an inner surface of the at least one sidewall of the sleeve may be correspondingly threaded for releasable threaded engagement between the sleeve and the piston. An upper surface of the closed upper end of the sleeve may have a plurality of apertures or recesses formed therein, allowing a tool with corresponding pins or blades to engage the sleeve from above for easy removal of the sleeve from the piston.

In an alternative embodiment, the piston and connecting rod assembly similarly includes a piston pivotally secured to a connecting rod. However, the connecting rod has upper and lower portions that are releasably secured to one another. The upper portion of the connecting rod has opposed upper and lower ends. The upper end of the upper portion is pivotally secured to the piston by a piston pin. The lower portion of the connecting rod also has opposed upper and lower ends. The lower end of the lower portion has a passage formed therethrough for receiving a crankpin. The lower end of the upper portion of the connecting rod is releasably secured to the upper end of the lower portion of the connecting rod by any suitable form of releasable attachment. For example, a threaded bolt may be mounted on the upper end of the lower portion of the connecting rod for releasable engagement within a threaded recess formed in the lower end of the upper portion of the connecting rod. It should be understood that this attachment may be reversed, i.e., the threaded recess may be formed in the upper end of the lower portion of the connecting rod, and the threaded bolt may be mounted to the lower end of the upper portion of the connecting rod.

These and other features of the present disclosure will become readily apparent upon further review of the following specification and drawings.

DETAILED DESCRIPTION OF THE PREFERRED EMBODIMENTS

Figure 1:
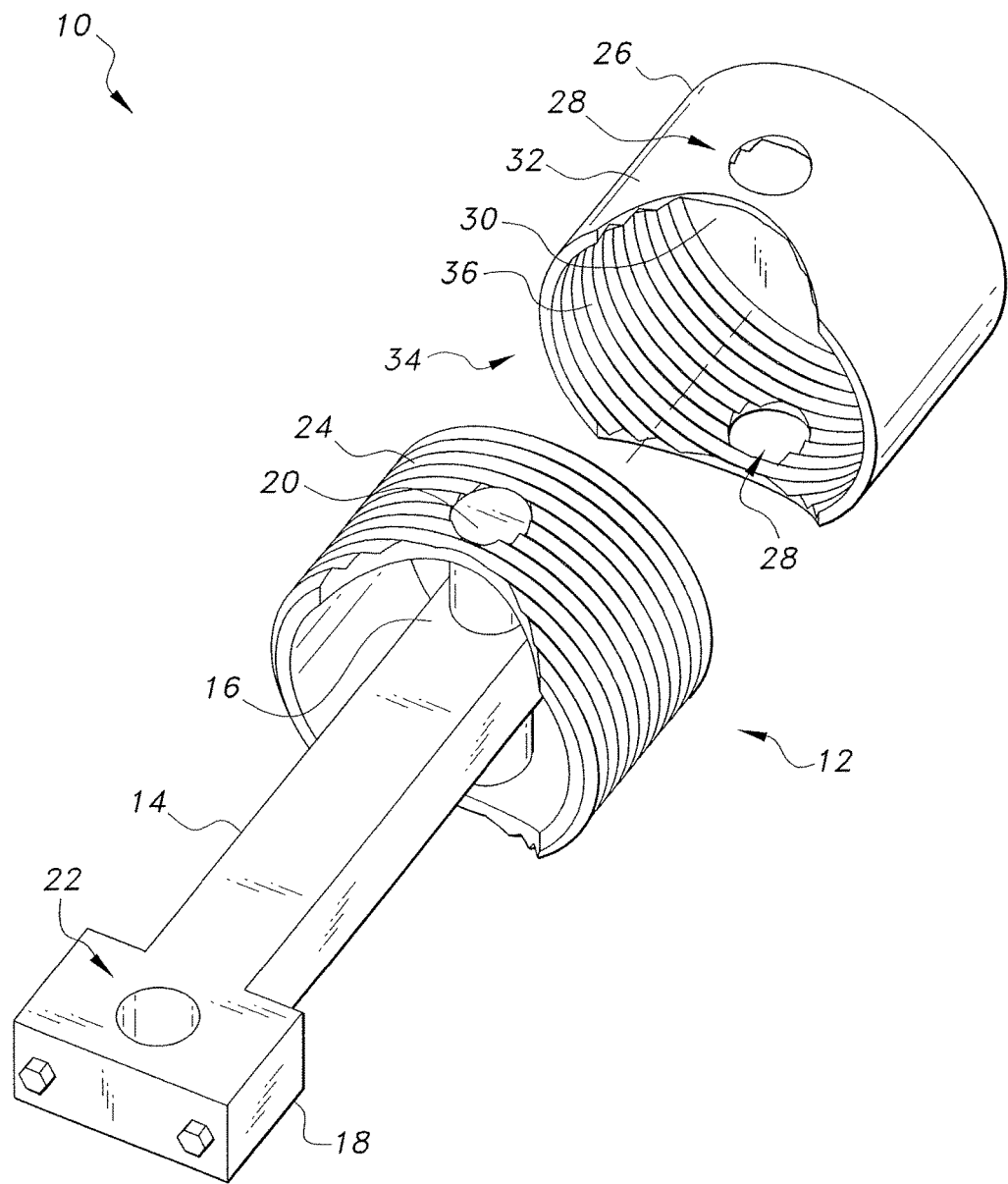
FIG. 1 is a perspective view of a first embodiment of a piston and connecting rod assembly for an internal combustion engine.
Figure 2:
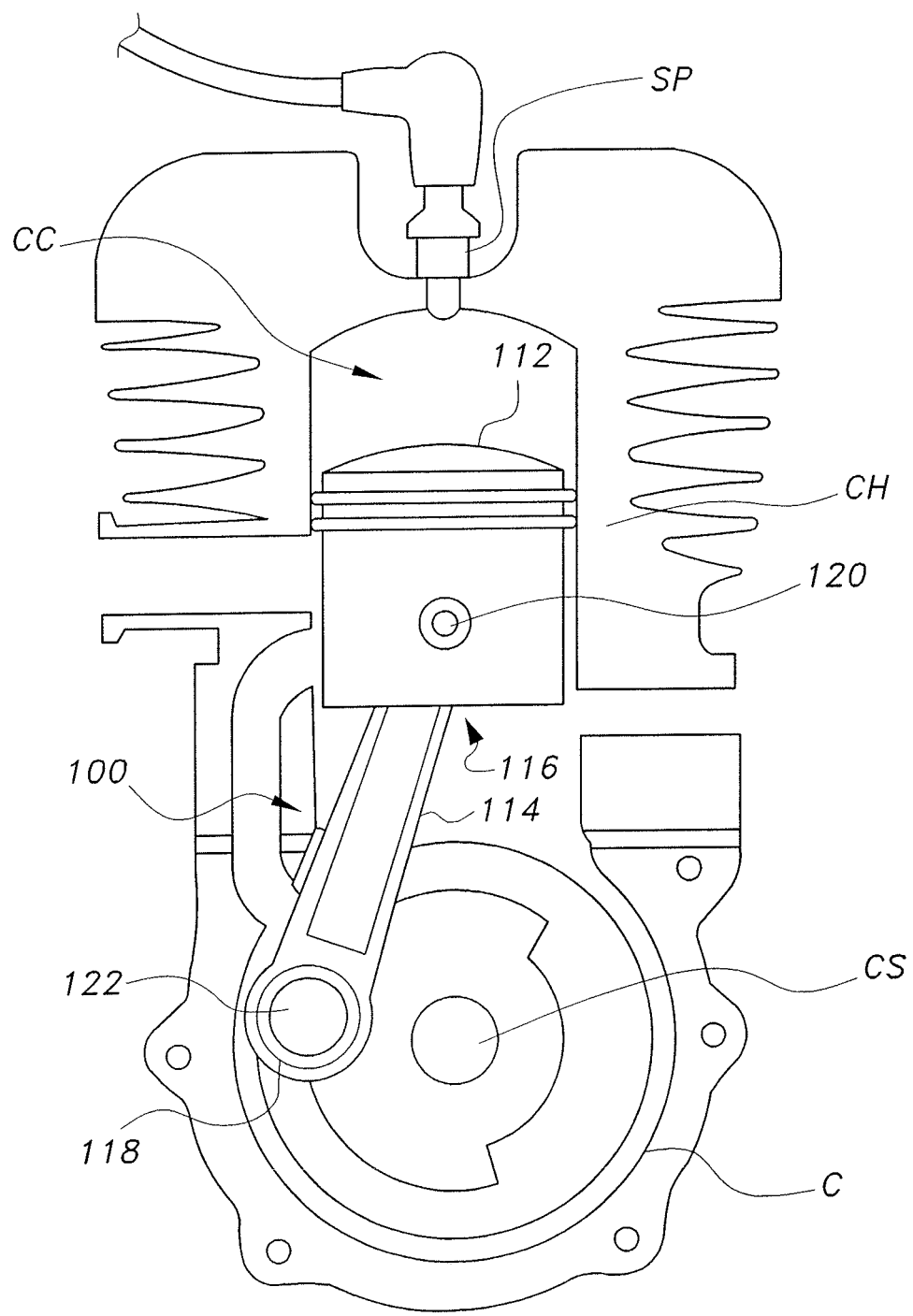
FIG. 2 is a diagrammatic environmental front view of a piston and connecting rod assembly of the prior art.

Referring to FIG. 1, a first embodiment of the piston and connecting rod assembly for an internal combustion engine, designated generally as 10 in the drawings, includes a piston 12 and a connecting rod 14, where the connecting rod 14 has opposed upper and lower ends 16, 18, respectively. The upper end 16 is pivotally secured to the piston 12 by a conventional piston pin 20. The lower end 18 of the connecting rod 14 has a passage 22 formed therein for receiving a conventional crankpin. However, an additional sleeve 26 is provided for the piston 12, as shown.

The sleeve 26 has at least one sidewall 32, a closed upper end 30 and an open lower end 34. For an exemplary conventional cylindrical piston, the at least one sidewall 32 is cylindrical. Openings 28 may be formed through the sidewall 32, corresponding to the diametrically opposed ends of the piston pin 20. The sleeve 26 is dimensioned and configured to removably and releasably receive and cover the piston 12. The sleeve 26 is releasably secured to the piston 12 by any suitable type of releasable attachment or engagement. For example, as shown in FIG. 1, an outer surface 24 of the piston 12 may be threaded and an inner surface 36 of the at least one sidewall 32 of the sleeve 26 may be correspondingly threaded for releasable threaded engagement between the sleeve 26 and the piston 12.

Figure 3:
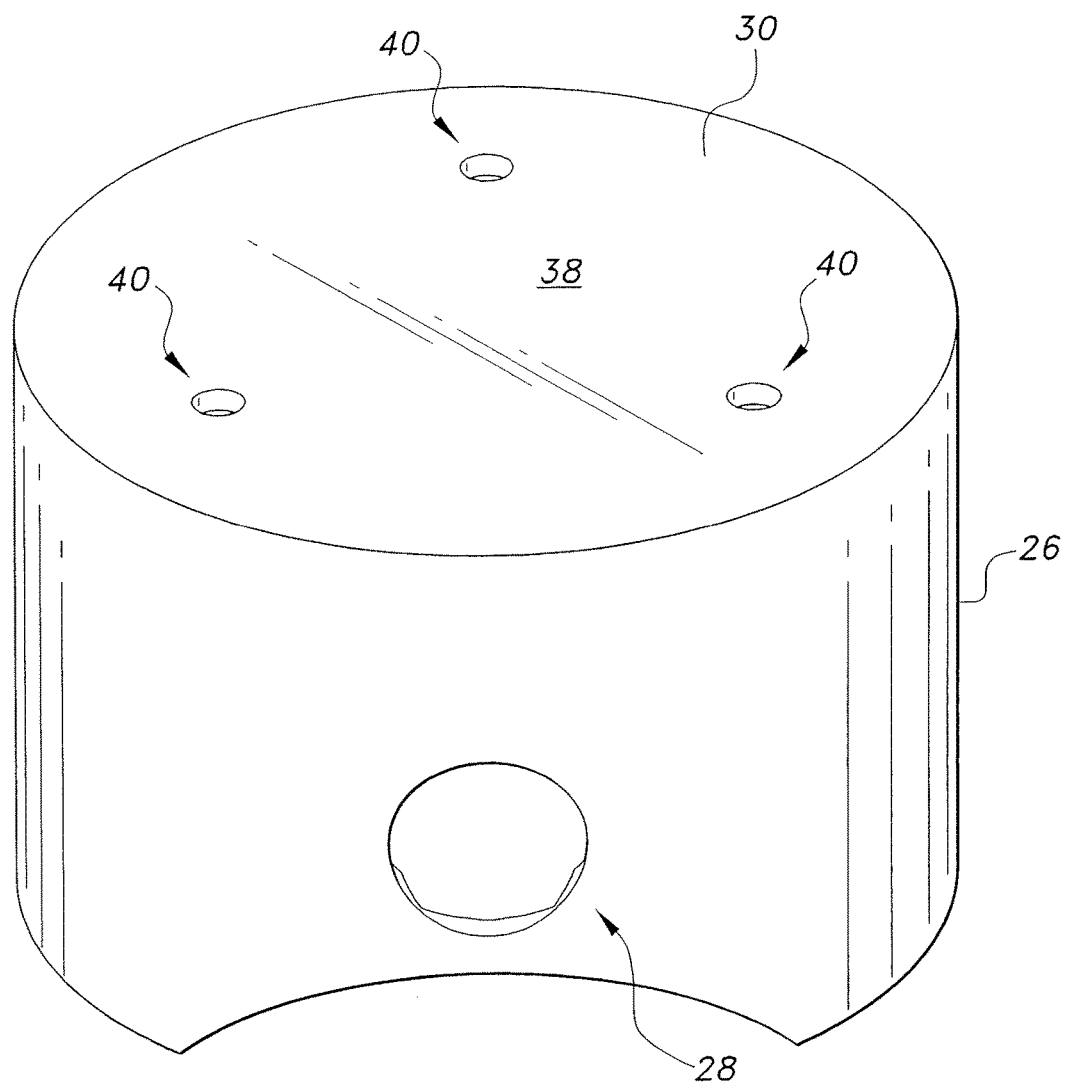
FIG. 3 is a perspective view of the sleeve of the piston and connecting rod assembly of FIG. 1.
Figure 4:
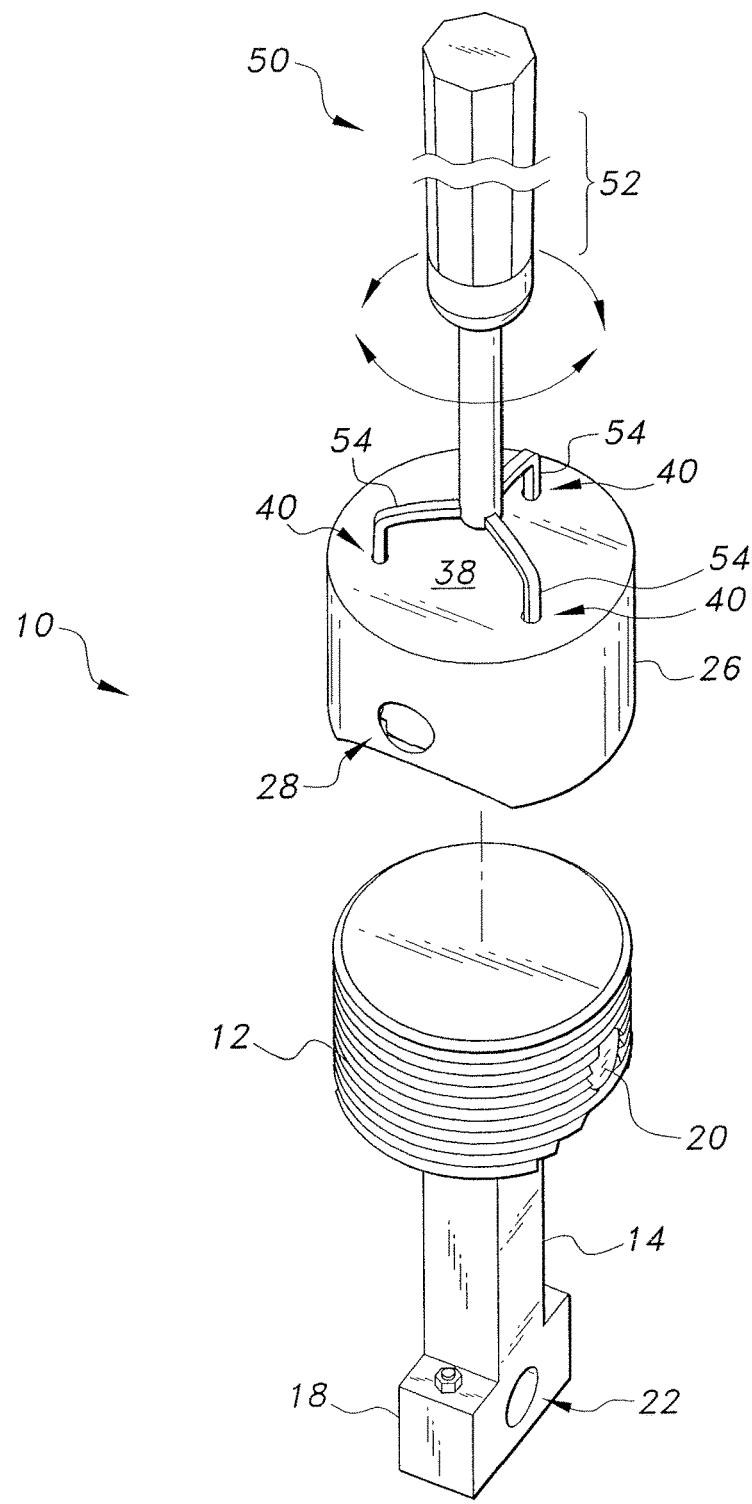
FIG. 4 is a perspective view of the piston and connecting rod assembly of FIG. 1, showing a tool for installation and removal of the sleeve from the piston.

As shown in FIGS. 3 and 4, an upper surface 38 of the closed upper end 30 of the sleeve 26 may have a plurality of apertures or recesses 40 formed therein, allowing a tool 50 with corresponding pins or blades 54 to engage the sleeve 26 from above for easy removal of the sleeve 26 from the piston 12. When the piston and connecting rod assembly for an internal combustion engine 10 is in use within an engine in the conventional manner, the sleeve 26 is tightly secured to the piston 12. If the sleeve 26 is damaged, or otherwise requires removal or replacement, the user may easily insert the tool 50 through the top of the combustion chamber and simply remove the sleeve 26 without requiring excessive disassembly of the engine's components. It should be understood that the tool 50, including the handle portion 52 and the pins or blades 54, is shown for exemplary purposes only. Any suitable number of apertures or recesses 40 may be formed in upper surface 38 of the closed upper end 30 of the sleeve 26, and the apertures or recesses 40 may have any desired configuration, relative dimensions and spacing. The tool 50 may be any suitable type of tool for engaging the particular configuration of the sleeve 26 and its associated apertures or recesses 40.

Figure 5:
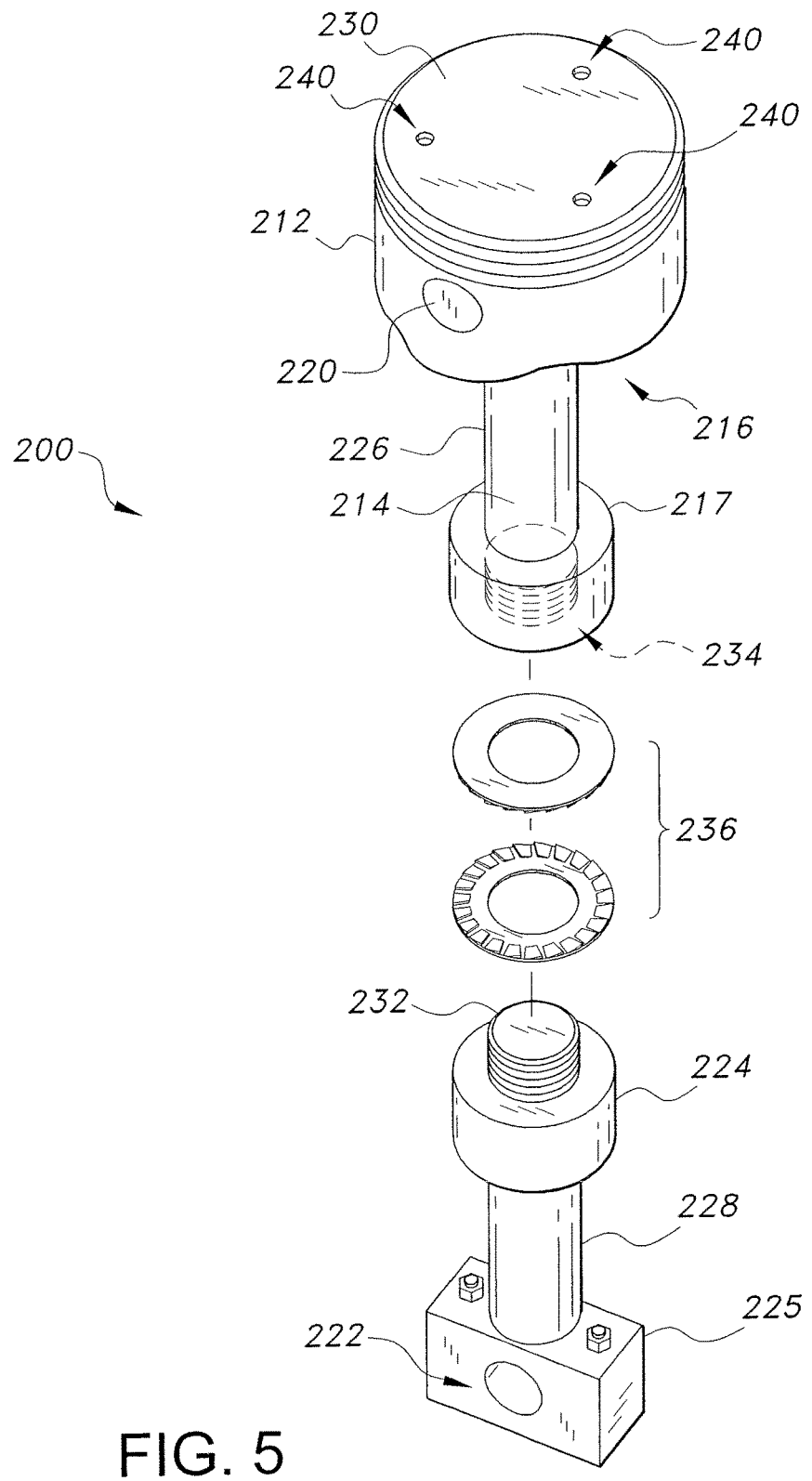
FIG. 5 is a perspective view of an alternative embodiment of the piston and connecting rod assembly for an internal combustion engine.

In the alternative embodiment of FIG. 5, the piston and connecting rod assembly for an internal combustion engine, designated generally as 200 in the drawing, similarly includes a piston 212 pivotally secured to a connecting rod 214. However, the connecting rod 214 includes upper and lower portions 226, 228, respectively, which are releasably secured to one another. The upper portion 226 of the connecting rod 214 has opposed upper and lower ends 216, 217, respectively. The upper end 216 of the upper portion 226 is pivotally secured to the piston 212 by a piston pin 220. The lower portion 228 of the connecting rod 214 also has opposed upper and lower ends 224, 225, respectively, the lower end 225 of the lower portion 228 having a passage 222 formed therein for receiving a crankpin.

The lower end 217 of the upper portion 226 of the connecting rod 214 is releasably secured to the upper end 224 of the lower portion 228 of the connecting rod 214 by any suitable form of releasable attachment. For example, as shown in FIG. 5, a threaded bolt 232 may be formed on the upper end 224 of the lower portion 228 of the connecting rod 214 for releasable engagement within a threaded recess 234 formed in the lower end 217 of the upper portion 226 of the connecting rod 214. It should be understood that this attachment may be reversed, i.e., the threaded recess 234 may be formed in the upper end 224 of the lower portion 228 of the connecting rod 214, and the threaded bolt 232 may be formed at the lower end 217 of the upper portion 226 of the connecting rod 214.

As shown in FIG. 5, the upper end 230 of the piston 212 has a plurality of apertures or recesses 240 formed therein, similar to the apertures or recesses 40 of the first embodiment of the assembly 10. Thus, a tool, such as tool 50 of FIG. 4, may be used to easily separate the combined piston 212 and upper portion 226 of the connecting rod 214 from the lower portion 228 of the connecting rod 214. When the piston and connecting rod assembly for an internal combustion engine 200 is in use within an engine in the conventional manner, the upper portion 226 of the connecting rod 214 is tightly secured to the lower portion 228 of the connecting rod 214. As shown in FIG. 5, in order to increase strength, stability, and frictional engagement, the lower end 217 of the upper portion 226 and the upper end 224 of the lower portion 228 are each preferably flared or otherwise increased in diameter with respect to the remainder of the connecting rod 214. Additionally, in order to increase frictional engagement between the upper portion 226 and the lower portion 228, a conventional two-piece lock washer 236 or the like may be frictionally secured therebetween.

If the piston 212 or the upper portion 226 of the connecting rod 214 is damaged or otherwise requires removal or replacement, the user may easily insert a tool, such as tool 50 of FIG. 4, through the top of the combustion chamber and simply remove the combined piston 212 and upper portion 226 of the connecting rod 214 without requiring excessive disassembly of the engine's components. As in the first embodiment, it should be understood that any suitable number of apertures or recesses 240 may be formed in the upper end 230 of the piston 212, and the apertures or recesses 40 may have any desired configuration, relative dimensions, and spacing.

Figure 6:
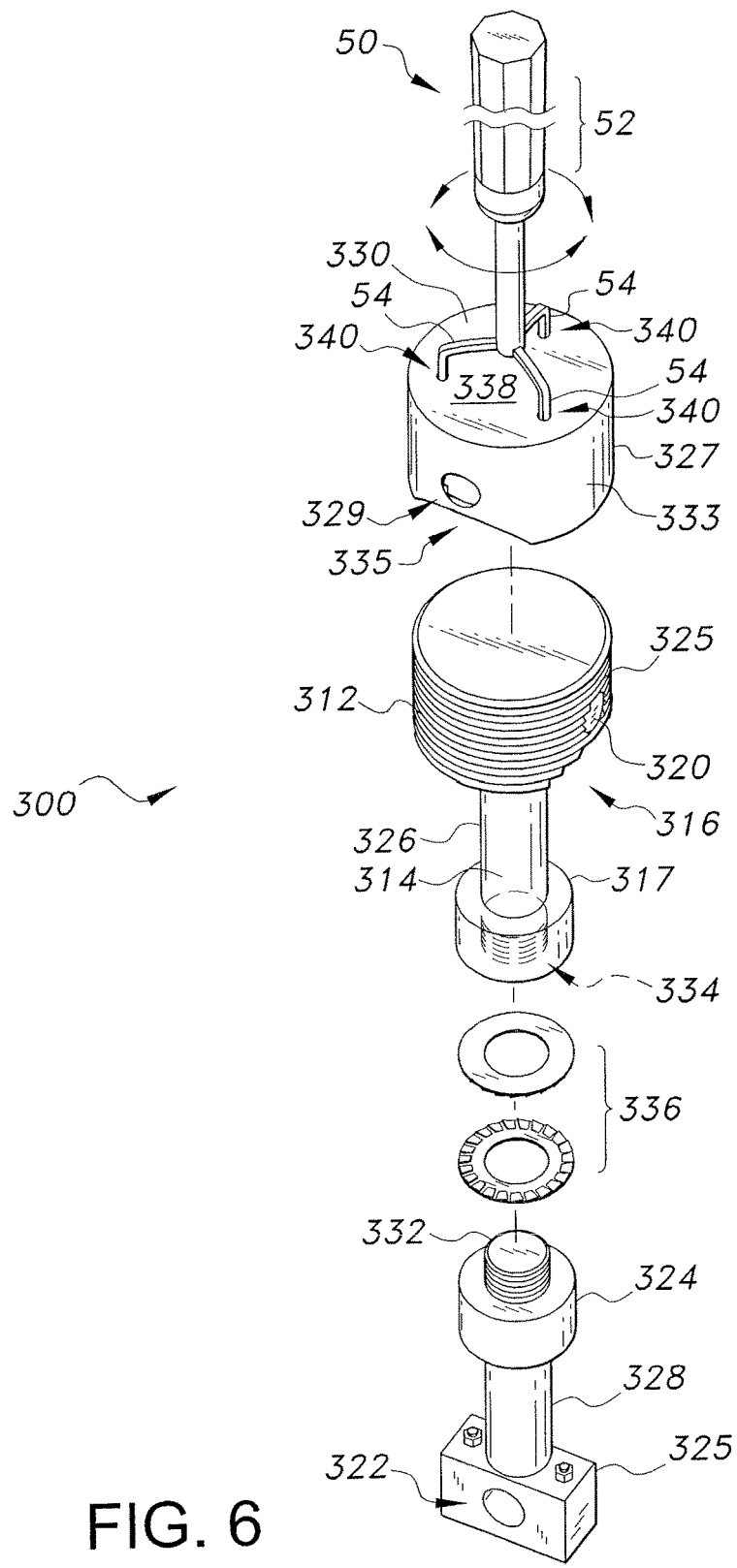
FIG. 6 is a perspective view of another alternative embodiment of the piston and connecting rod assembly for an internal combustion engine Similar reference characters denote corresponding features consistently throughout the attached drawings.

The alternative embodiment of FIG. 6 is drawn towards a piston and connecting rod assembly 300 which combines features of the embodiments of FIGS. 4 and 5. The piston and connecting rod assembly 300 includes a piston 312 and a connecting rod 314. The connecting rod 314 includes upper and lower portions 326, 328, respectively, which are releasably secured to one another. The upper portion 326 of the connecting rod 314 has opposed upper and lower ends 316, 317, respectively. The upper end 316 of the upper portion 326 is pivotally secured to the piston 312 by a piston pin 320. The lower portion 328 of the connecting rod 314 also has opposed upper and lower ends 324, 325, respectively, the lower end 325 of the lower portion 328 having a passage 322 formed therein for receiving a crankpin.

The lower end 317 of the upper portion 326 of the connecting rod 314 is releasably secured to the upper end 324 of the lower portion 328 of the connecting rod 314 by any suitable form of releasable attachment. For example, as shown in FIG. 6, a threaded bolt 332 may be formed on the upper end 324 of the lower portion 328 of the connecting rod 314 for releasable engagement within a threaded recess 334 formed in the lower end 317 of the upper portion 326 of the connecting rod 314. It should be understood that this attachment may be reversed, i.e., the threaded recess 334 may be formed in the upper end 324 of the lower portion 328 of the connecting rod 314, and the threaded bolt 332 may be formed at the lower end 317 of the upper portion 326 of the connecting rod 314.

Similar to the embodiment of FIG. 4, the piston and connecting rod assembly 300 includes an additional sleeve 327 for the piston 312, as shown. The sleeve 327 has at least one sidewall 333, a closed upper end 330 and an open lower end 335. For an exemplary conventional cylindrical piston, the at least one sidewall 333 is cylindrical. Openings 329 may be formed through the sidewall 333, corresponding to the diametrically opposed ends of the piston pin 320. The sleeve 327 is dimensioned and configured to removably and releasably receive and cover the piston 312. The sleeve 327 is releasably secured to the piston 312 by any suitable type of releasable attachment or engagement. For example, as shown in FIG. 6, an outer surface 325 of the piston 312 may be threaded and an inner surface of the at least one sidewall 333 of the sleeve 327 may be correspondingly threaded for releasable threaded engagement between the sleeve 327 and the piston 312.

Similar to the previous embodiments, an upper surface 338 of the closed upper end 330 of the sleeve 327 may have a plurality of apertures or recesses 340 formed therein, allowing tool 50, with corresponding pins or blades 54, to engage the sleeve 327 from above for easy removal of the sleeve 327 from the piston 312. Similar to the embodiment of FIG. 5, in order to increase strength, stability, and frictional engagement, the lower end 317 of the upper portion 326 and the upper end 324 of the lower portion 328 are each preferably flared or otherwise increased in diameter with respect to the remainder of the connecting rod 314. Additionally, in order to increase frictional engagement between the upper portion 326 and the lower portion 328, a conventional two-piece lock washer 336 or the like may be frictionally secured therebetween.

It is to be understood that the piston and connecting rod assembly is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A piston and connecting rod assembly, comprising:
   a piston;
   a piston pin;
   a connecting rod having opposed upper and lower ends, the upper end being pivotally secured to the piston by the piston pin, the lower end thereof having a passage formed therein adapted for receiving a crankpin; and
   a sleeve having at least one sidewall, a closed upper end and an open lower end, the sleeve removably and releasably receiving and covering the piston, wherein the at least one sidewall has a pair of openings formed therethrough, the pair of openings being adapted for alignment with diametrically opposed ends of the piston pin.

2. The piston and connecting rod assembly as recited in claim 1, wherein said piston is cylindrical.

3. The piston and connecting rod assembly as recited in claim 2, wherein the sleeve is cylindrical.

4. The piston and connecting rod assembly as recited in claim 3, wherein said piston has a threaded outer surface and the at least one sidewall of said sleeve has a mating threaded inner surface, such that said sleeve removably and releasably receives and covers said piston by threaded engagement with said piston.

5. The piston and connecting rod assembly as recited in claim 1, wherein the closed upper end of said sleeve has at least one recess formed in an outer surface thereof, whereby the at least one recess is adapted for receiving at least a portion of a tool for removal of the sleeve from the piston.

6. A piston and connecting rod assembly for an internal combustion engine, comprising:
   a piston;
   a piston pin;
   a connecting rod having upper and lower portions, the upper portion having opposed upper and lower ends, the upper end of the upper portion being pivotally secured to the piston by the piston pin, the lower portion having opposed upper and lower ends, the lower end of the lower portion having a passage formed therein adapted for receiving a crankpin, the lower end of the upper portion of said connecting rod is releasably secured to the upper end of the lower portion of the connecting rod;
   a sleeve having at least one sidewall, a closed upper end and an open lower end, the sleeve removably and releasably receiving and covering the piston, wherein the at least one sidewall has a pair of openings formed therethrough, the pair of openings being adapted for alignment with diametrically opposed ends of the piston pin; and
   a threaded bolt formed on the upper end of the lower portion of the connecting rod, the lower end of the upper portion of the connecting rod having a threaded recess formed therein, the threaded bolt engaging the threaded recess to selectively connect the upper and lower portions of the connecting rod.

7. The piston and connecting rod assembly as recited in claim 6, further comprising a lock washer frictionally secured between the upper end of the lower portion of said connecting rod and the lower end of the upper portion of said connecting rod.

8. The piston and connecting rod assembly as recited in claim 6, wherein said piston is cylindrical.

9. The piston and connecting rod assembly as recited in claim 8, wherein the sleeve is cylindrical.

10. The piston and connecting rod assembly as recited in claim 9, wherein said piston has a threaded outer surface and the at least one sidewall of said sleeve has a mating threaded inner surface, such that said sleeve removably and releasably receives and covers said piston by threaded engagement with said piston.

11. The piston and connecting rod assembly as recited in claim 6, wherein the closed upper end of said sleeve has at least one recess formed in an outer surface thereof, whereby the at least one recess is adapted for receiving at least a portion of a tool for removal of the sleeve from the piston.

* * * * *